United States Patent [19]

Martin

[11] Patent Number: 5,832,306
[45] Date of Patent: Nov. 3, 1998

[54] ACKNOWLEDGE TRIGGERED FORWARDING OF EXTERNAL BLOCK DATA RESPONSES IN A MICROPROCESSOR

[75] Inventor: Randal Gordon Martin, San Jose, Calif.

[73] Assignee: Silicon Graphics, Inc., Mountain View, Calif.

[21] Appl. No.: 544,537

[22] Filed: Oct. 18, 1995

[51] Int. Cl.$^6$ .................................................. G06F 13/00
[52] U.S. Cl. ............................................ 395/872; 371/31
[58] Field of Search .... 371/31–33; 395/182.13–182.16, 395/250, 872–877

[56] References Cited

U.S. PATENT DOCUMENTS

| | | | |
|---|---|---|---|
| 3,571,505 | 3/1971 | Mounts | 348/416 |
| 4,408,323 | 10/1983 | Montgomery | 370/389 |
| 5,303,302 | 4/1994 | Burrows | 380/49 |
| 5,418,781 | 5/1995 | Kaufman et al. | 370/413 |
| 5,463,737 | 10/1995 | Saitoh | 395/496 |
| 5,568,139 | 10/1996 | Yoon | 341/67 |
| 5,608,883 | 3/1997 | Kando et al. | 395/309 |

*Primary Examiner*—Lance Leonard Barry, Esq.
*Attorney, Agent, or Firm*—Sterne, Kessler, Goldstein & Fox P.L.L.C.

[57] ABSTRACT

A computer system and method using an acknowledging triggered forwarding mechanism for managing the receipt of an external block data response from an external agent. The mechanism consists of an incoming buffer and control logic. The incoming buffer connects internal memory units, such as a load store unit (LSU), cache, and instruction fetch unit (IFU) to an external agent. An external block data response sent by the external agent is stored in an entry partition in the incoming buffer until the validity of the data can be verified. Control logic connects the incoming buffer and the external agent. An external agent sends an external completion response to the control logic to report the status of the data in the incoming buffer. The data in the incoming buffer is forwarded to the internal memory units only if the control logic receives an acknowledge response from the external agent. If the control logic receives a negative acknowledge or bus error from the external agent, the data is discarded and the error is forwarded to the internal memory units.

7 Claims, 6 Drawing Sheets

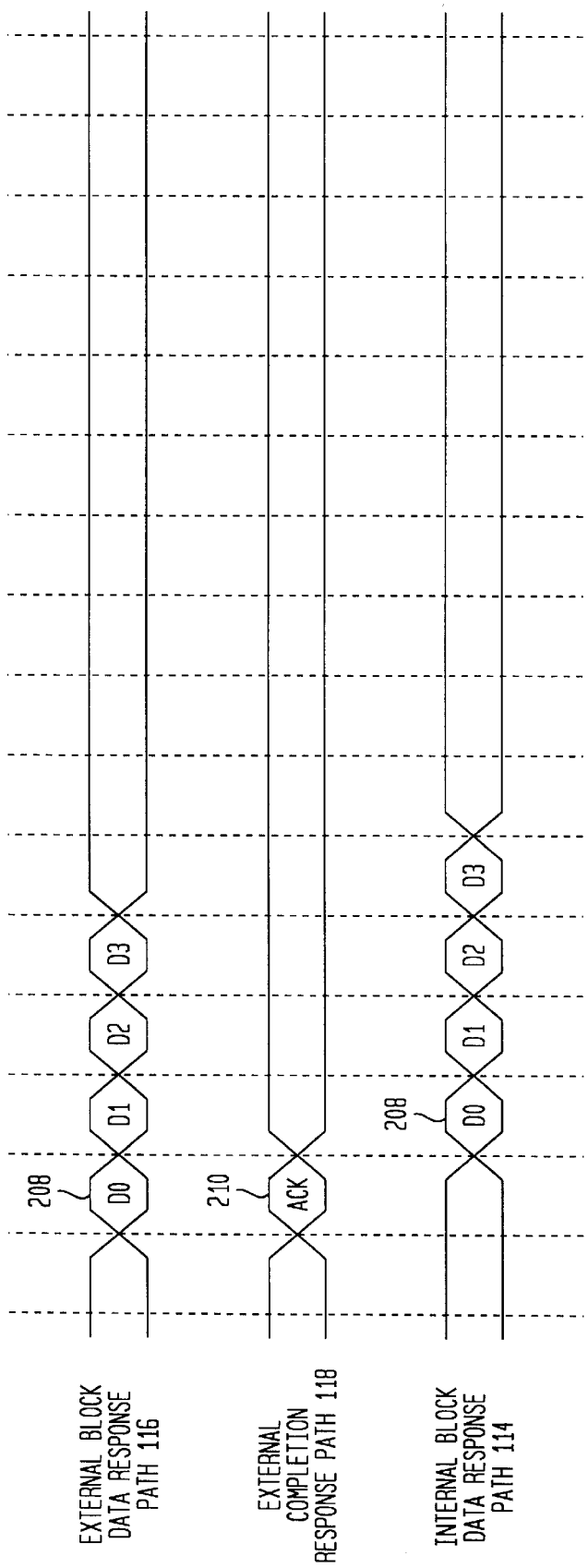

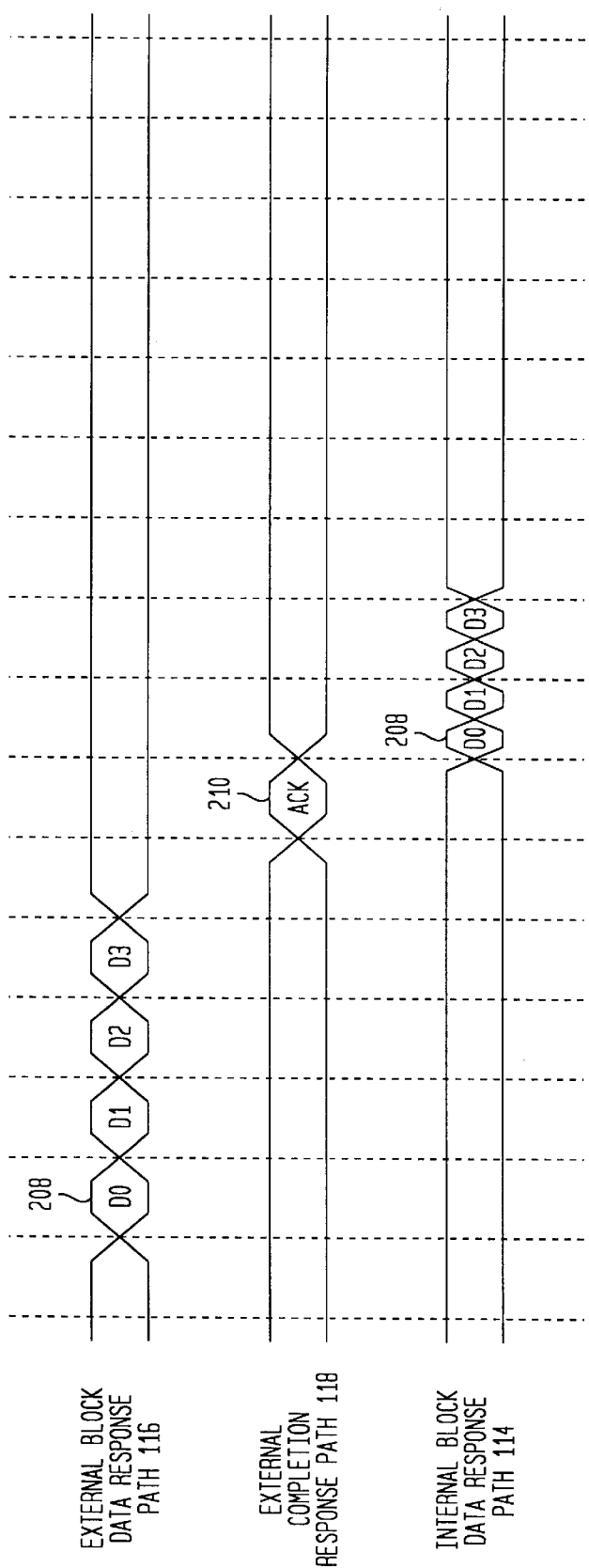

ACKNOWLEDGE TRIGGERED FORWARDING OF EXTERNAL BLOCK DATA RESPONSES IN A MICROPROCESSOR

BACKGROUND OF THE INVENTION

1. Field of the Invention

This invention relates to microprocessor memory management schemes, and more specifically to a microprocessor incorporating an incoming data buffer and control logic to regulate all incoming data blocks from an external agent to the microprocessor. The invention provides a mechanism for forwarding into the microprocessor only those data blocks that have been validated, thereby increasing the performance and efficiency of the microprocessor.

2. Related Art

Microprocessors have developed dramatically over the last few years and one area of change is how the internal memory structure of a microprocessor receives external block data. Prior microprocessors implemented a serial mechanism in which the microprocessor was suspended while external block data was read directly into internal memory. For example, in the R4000 series of microprocessors, available from MIPS Technologies, Inc., Mountain View, Calif., block data was first read into the microprocessor's secondary cache, then into the primary cache, and then into the load store unit (LSU) and the instruction fetch unit (IFU). This process executed sequentially and suspended the microprocessor until all memory units received the block data. Once the memory units received the block data, the microprocessor accessed the data. This memory management scheme was very simple, but very inefficient.

Modern microprocessors, such as the R10000 series, also available from MIPS Technologies, Inc., have incorporated a streaming feature into their internal memory management schemes for receiving external block data from an external agent. Under this scheme the microprocessor is not suspended, but rather, accesses the data immediately upon receipt of the first data element. Block data is read directly into the primary cache, LSU and IFU, and is immediately available to the microprocessor. The microprocessor accesses each data element as it becomes available. This scheme minimizes the latency of when the microprocessor has access to the data, thereby significantly increasing microprocessor performance.

The problem associated with this feature is that the condition, or validity, of an external block data response may not be known until some time after the first data element is available. Unfortunately, validity may not be known until well after the microprocessor has started to process the data. As a result, there are severe problems to overcome when a microprocessor has processed erroneous external block data. The invalid data must be discarded and replaced with valid data. Additionally, any processing of the invalid data must be "un-done" thereby restoring the microprocessor's state to its pre-processing status. These corrections require large amounts of computational time as well as additional memory to continuously store the pre-processing state of the microprocessor.

There are two common situations in which the condition of the block data response is not known until after the first data element is received. First, a network interface often implements error checking by sending a CRC at the end of each block of data. Second, in a directory based coherency scheme, an external agent accesses in parallel block data and its associated directory structure for determining ownership of the data block. Accessing the directory and making the necessary comparisons often take longer than retrieving the first data element into the microprocessor. In both situations, the microprocessor has started processing the data before receiving notice that the data is valid.

One solution to this problem is to provide a buffer in the external agent. The block data would be queued in this buffer until the condition of the external block data response is known. This solution, however, has several significant disadvantages. First, the buffer would require space in the external agent which may not be readily available. Second, the bandwidth of an external block data response path, used by the external agent to transfer block data to the microprocessor, is typically significantly less than the internal block data response path bandwidth, used to interconnect the internal memory units of the microprocessor. Thus, any delay in transmitting the block data over the external block data response path will increase latency. Third, there is some overhead associated with arbitrating for the external block data response path which also increases latency.

SUMMARY OF THE INVENTION

The present invention provides a system and method to regulate all incoming data blocks from an external agent to a microprocessor. The present invention incorporates an incoming buffer and control logic into the microprocessor to thereby increase overall performance and efficiency of the microprocessor. The incoming buffer acts like a gateway into the microprocessor and stores an external block data response transferred from an external agent to the cache, LSU and IFU. The external agent stores the external block data response in the incoming buffer until it directs the control logic with an external completion response to forward the external block data response from the incoming buffer to the cache, LSU and IFU.

The control logic receives an external completion response from the external agent. The external completion response can be an acknowledge, negative acknowledge, or bus error. If the control logic receives an acknowledge completion response, the control logic forwards the external block data response from the incoming buffer to the cache, LSU and IFU. If the control logic receives a negative acknowledge or bus error, the incoming buffer is directed to discard the external block data response and trigger the microprocessor to take an exception or retry the operation.

The present invention does not interfere with the primary advantage of the streaming feature, i.e., that the microprocessor has immediate access to the data. If the condition of an external block data response is known when the first data element is available, the external agent supplies an external acknowledge completion response in the same cycle as it supplies the first data element of the external block data response. The incoming buffer will then immediately forward the block data to the cache, LSU and IFU. Latency is not impacted and the microprocessor begins to process the data as received. Thus, the invention does not interfere with the streaming feature of some modern microprocessors.

Unlike the conventional streaming feature, the present invention allows for speculative external block data responses. An external agent supplies a speculative external block data response to the incoming buffer when it does not know if the external block data response is valid. Once the external agent determines the validity of the external block data response, it supplies an external completion response to the control logic. Thus, the external block data response remains in the incoming buffer until an external completion response is received. This feature allows the external agent to overlay the external block data response in the incoming buffer with a new external block data response as many times as necessary to achieve a valid condition. Only when the external agent determines the external block data response is valid is it forwarded from the incoming buffer to the internal memory units. This is an important aspect of the invention because as microprocessor systems using directory based inherency schemes and network based interconnects become prevalent, the use of speculative external block data responses will increase.

There is also a performance advantage to processing speculative external block data responses in the described manner of the present invention. In general, the bandwidth of the internal block data response path, connecting the incoming buffer to the memory units, is significantly higher than the bandwidth of the external block data response path connecting the external agent to the incoming buffer due to a wider data path, a higher clock frequency, or both. Therefore, it is important to store the external block data response in the incoming buffer as soon as possible. Once the external acknowledge completion response is supplied, the external block data response can be rapidly transferred over the higher bandwidth of the internal block data response path from the incoming buffer to the cache, LSU and IFU.

BRIEF DESCRIPTION OF THE FIGURES

FIG. 2A is a timing diagram illustrating a first mode of operation in which the external completion response is known when the first data element of an external block data response is available.

FIGS. 2B and 2C are two timing diagrams illustrating a second mode of operation in which the external completion response is unknown when the first data element of an external block data response is available.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is described in terms of an example environment in which a microprocessor is connected to an external agent. In the example environment, the microprocessor issues a block read request when it encounters a cache miss. In response, the external agent sends the microprocessor a corresponding external block data response consisting of multiple data elements. Description in these terms is provided for convenience only. It is not intended that the invention be limited to application in this example environment. In fact, after reading the following description, it will become apparent to a person skilled in the relevant art how to implement the invention in alternative environments.

Figure 1:
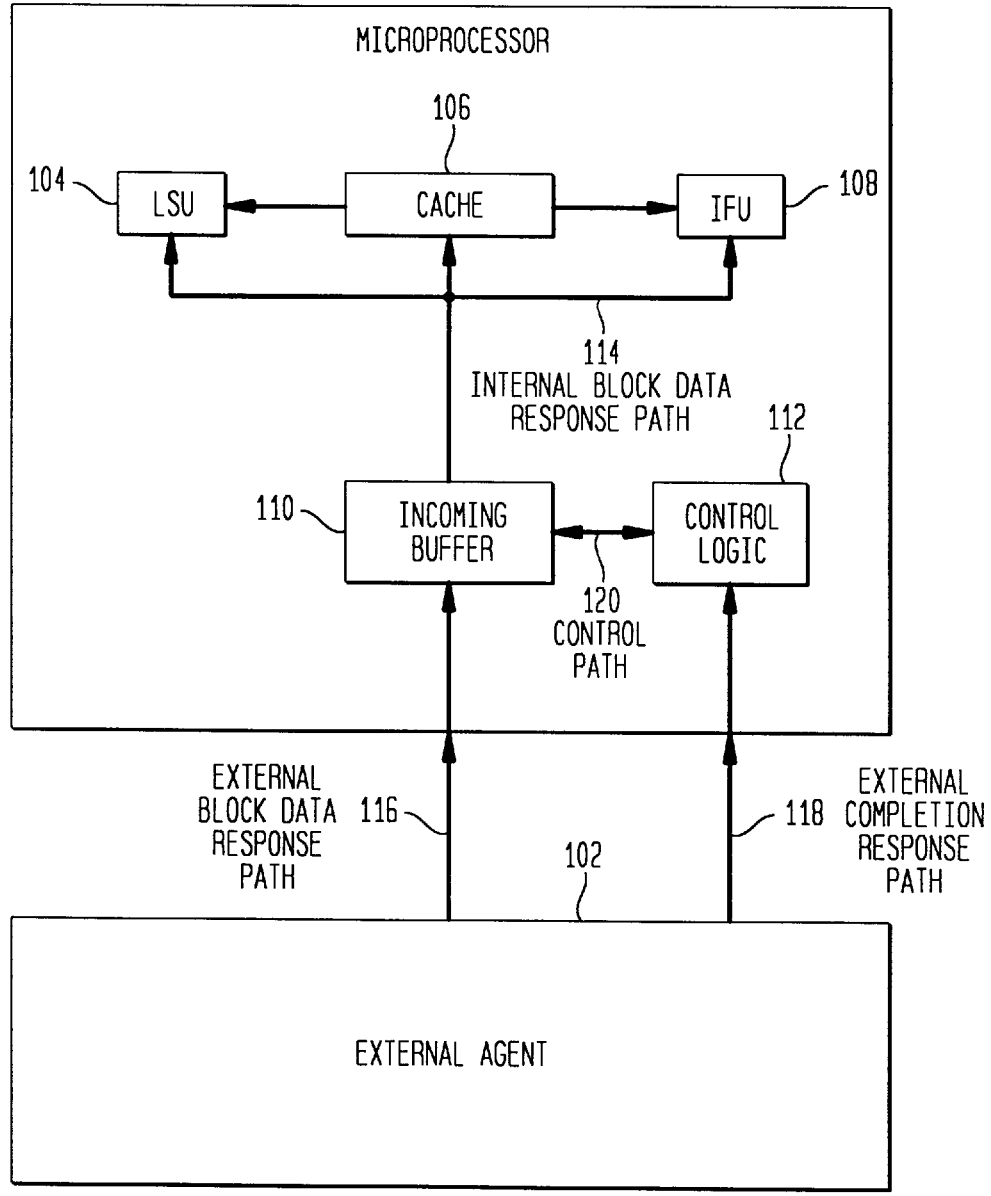
FIG. 1 is a block diagram of the logical structure of the acknowledge triggered forwarding mechanism.

FIG. 1 is a block diagram of the logical structure of a microprocessor 100 receiving an external block data response from an external agent 102. Examples of an external agent 102 are an ASIC chip, memory system, and input/output system. The external agent 102 transfers the external block data response over the external block data response path 116 and stores the external block data response in an entry partition of the incoming buffer 110. The incoming buffer 110 comprises one or more entry partitions which are areas of memory dedicated to storing an external block data response from an external agent 102. There is one entry partition for each outstanding block read request. For example, the incoming buffer of the R10000 microprocessor has four entry partitions. The external block data response remains in the entry partition until the control logic 112 forwards the external block data response to the memory units of the microprocessor 100 which include a load store unit (LSU) 104, a cache 106, and an instruction fetch unit (IFU) 108.

The control logic 112 directs the incoming buffer 110 via a control path 120 to forward or discard the external block data response in its entry partition upon the receipt of an external completion response. The control logic 112 receives an external completion response from the external agent 102 over the external completion response path 118. The external completion response can be either an acknowledge, negative acknowledge, or a bus error. An acknowledge completion response indicates that the external block data response contains valid data thereby triggering the control logic 112 to forward the external block data response in the incoming buffer 110 to the LSU 104, cache 106, and IFU 108. A negative acknowledge or bus error completion response indicates a problem with the external block data response. Upon receipt of such a completion response, the external block data response in the incoming buffer 110 is discarded, and the microprocessor takes an exception, or retries the operation.

In the example environment, there are multiple entry partitions in the incoming buffer 110. One entry partition is allocated for each outstanding microprocessor block read request that the microprocessor 100 generates. The external agent 102 controls each entry partition independently by encoding an entry partition number in the external completion response sent to the control logic 112.

Figure 2B:
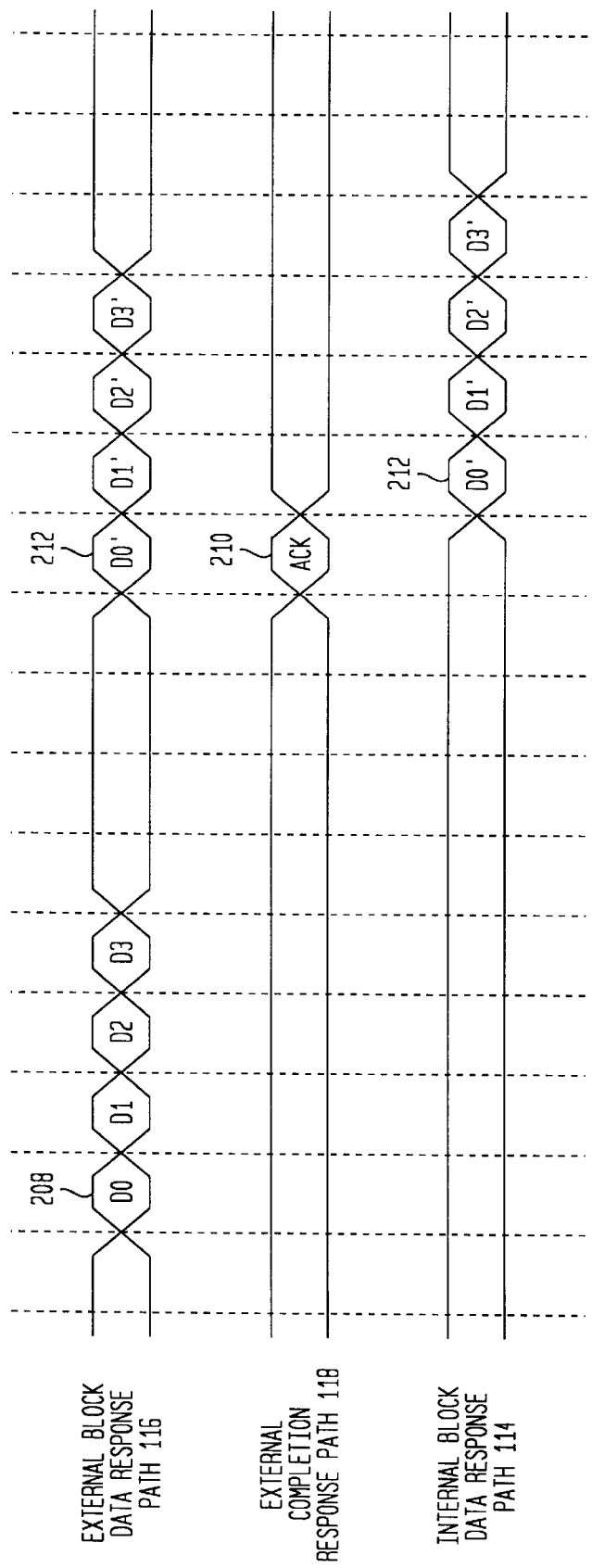

In FIGS. 2A–2C, the multiple data elements of an external block data response 208 are depicted by D0, D1, D2 and D3 where D0 is the first element, D1 is the second element, D2 is the third element, and D3 is the fourth element. FIG. 2A is a timing diagram illustrating a first mode of operation. In the first mode, the external agent 102 supplies an external acknowledge completion response 210 to the control logic 112 coincident with the first data element of the external block data response 208 sent to the incoming buffer 110. The data elements D0–D3 of the external block data response 208 are immediately forwarded over the internal block data response path 114 from the incoming buffer 110 to the LSU 104, cache 106, and IFU 108 as each data element is received. There is no latency penalty, however, the data elements D0–D3 can only be forwarded to the LSU 104, cache 106, and IFU 108 upon receipt. Therefore, a data element is transmitted over the internal block data response path 114 at the same data rate as it is received over the external block data response path 208. In the first mode of operation as shown in FIG. 2A, each transfer of a data element takes one cycle regardless of the path.

FIG. 2B and 2C are two timing diagrams illustrating a second mode of operation. In the second mode of operation, the external completion response is unknown when the first data element of an external block data response is available. FIG. 2B depicts the external agent 102 overlaying the external block data response 208, data elements D0–D3, in the incoming buffer 110 with a second external block data response 212, data elements D0'–D3'. The external agent 102 then supplies an external acknowledge completion response 210 coincident with the first data element D0' of the second external block data response 212. The data elements D0'–D3' of the second external block data response 212 are immediately forwarded over the internal block data response path 114 from the incoming buffer 110 to the LSU 104, cache 106, and IFU 108 as each data element is received. There is no latency penalty, however, the data elements D0'–D3' can only be forwarded upon receipt. Therefore, a data element is transmitted over the internal block data response path 114 at the same data rate as it is received over the external block data response path 208. In the second mode of operation as shown in FIG. 2B, each transfer of a data element takes one cycle regardless of the path.

FIG. 2C depicts the external agent 102 determining at a time after the external block data response 208 has been already stored in the incoming buffer 110 that the external block data response 208 is valid. The external agent 102 sends an external acknowledge completion response 210 at the time it determines the validity of the external block data response 208. The external block data response 208 is immediately forwarded from the incoming buffer 110 to the LSU 104, cache 106, and IFU 108 at the higher bandwidth supported by the internal block data response path 114. The bandwidth of the internal block data response path 114 is generally significantly higher than the bandwidth of the external block data response path 116 due to a wider data path, a higher clock frequency, or both. Therefore, FIG. 2C depicts the external block data response 208 being transmitted in fewer cycles across the internal block data response path 114 than across the external block data response path 116.

Figure 3:
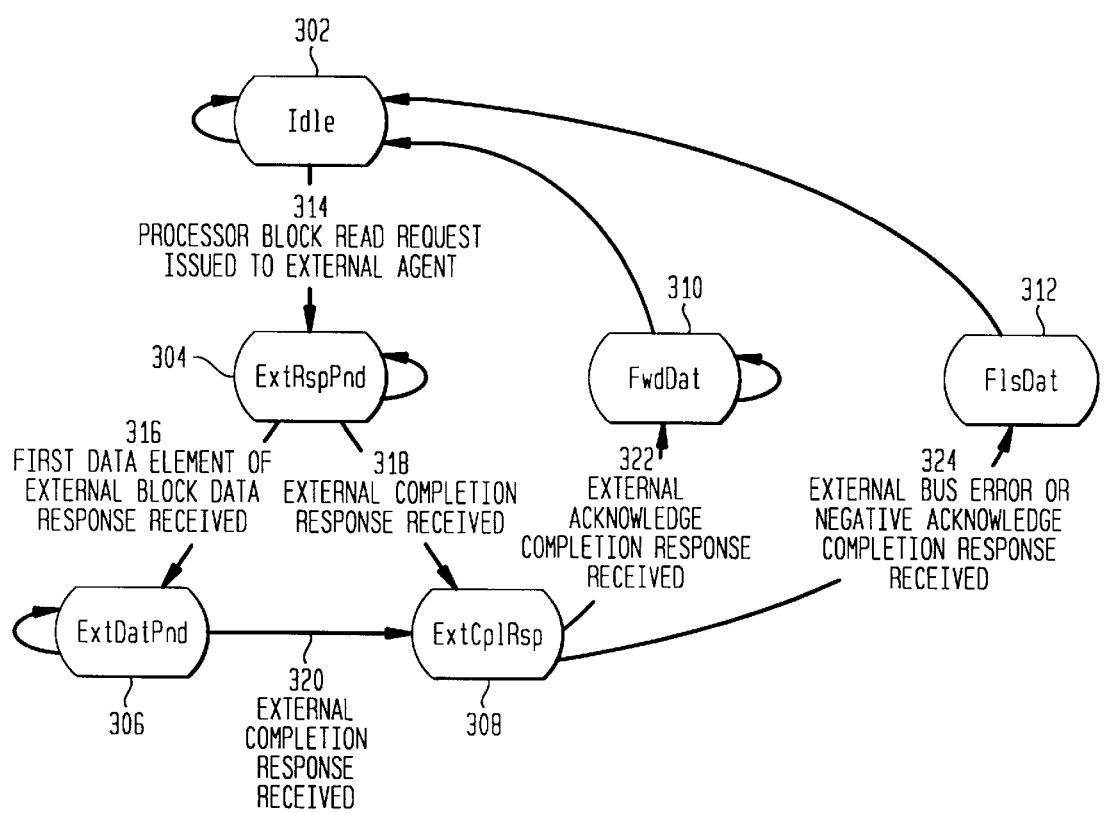
FIG. 3 is a state diagram of the Microprocessor.
Figure 4:
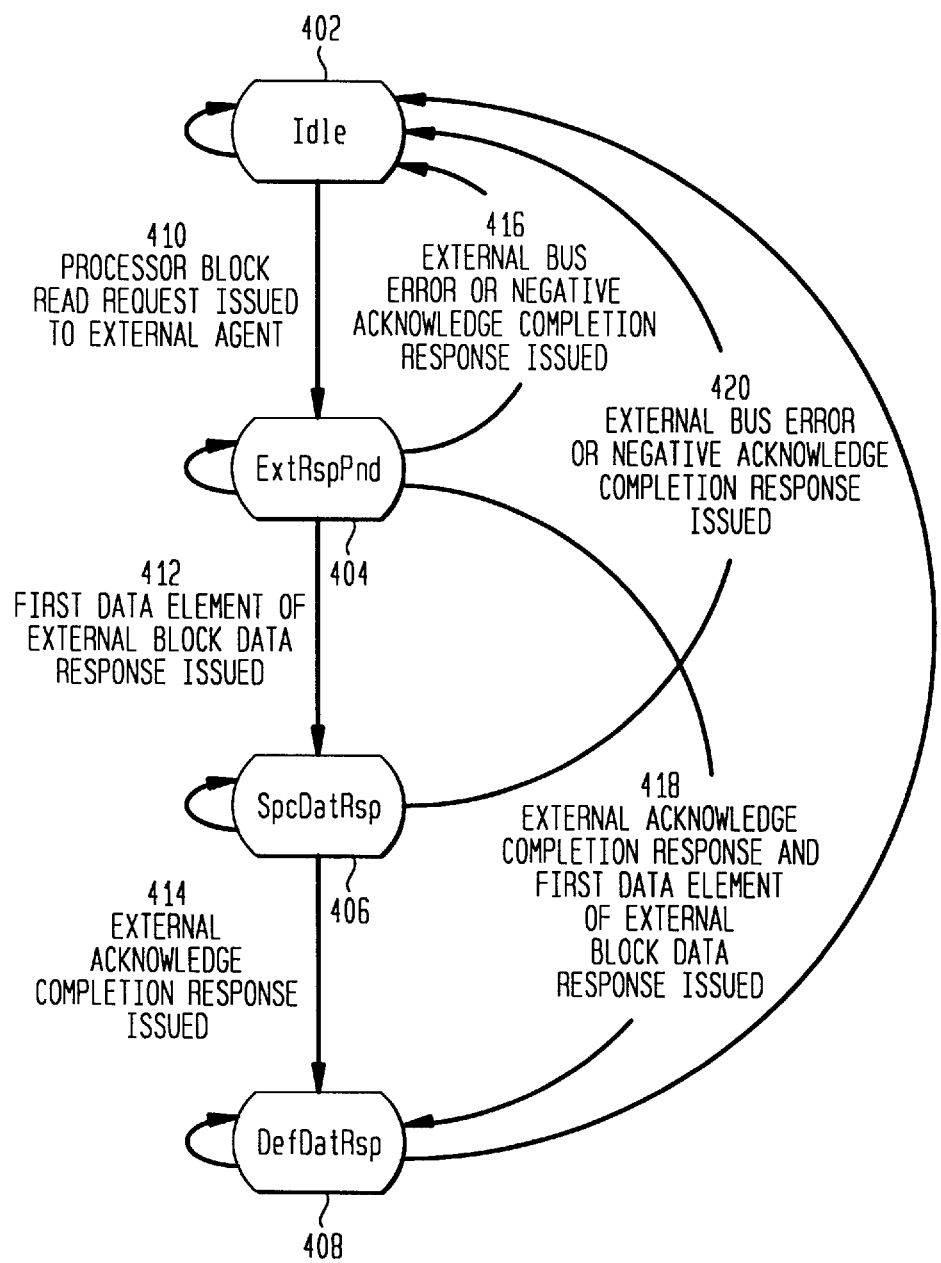
FIG. 4 is a state diagram of the External Agent.

The states required for an individual outstanding block read request are shown for both an external agent 102 and a microprocessor 100 in FIGS. 3 and 4. FIG. 3 illustrates the six states of a microprocessor 100 when issuing a block read request to an external agent 102. The default state is Idle 302 which indicates that the microprocessor 100 does not have an outstanding block read request. Upon issuing a block read request to an external agent 314, the microprocessor 100 enters the ExtRspPnd state 304 which indicates that an external response is pending. From the ExtRspPnd state 304, the microprocessor 100 can enter either of two states depending on the response received from the external agent 102. The microprocessor 100 enters the ExtDatRsp state 306 when the first data element of an external block data response is received 316 into the incoming buffer 110. The ExtDatRsp state 306 indicates that the microprocessor 100 has received data from the external agent 102, but the validity of the data is unknown. Upon entering the ExtDatRsp state 306, the microprocessor 100 must wait to receive an external completion response 320 from the external agent 102 before entering the ExtCplRsp state 308. The microprocessor 100 will not access the data until the external agent 102 verifies its validity. In the alternative, the microprocessor 100 directly enters the ExtCplRsp state 308 from the ExtRspPnd state 304 when an external completion response is received 318 from the external agent 102 concurrent with the external block data response.

Once the microprocessor 100 knows the status of the block read request and is in the ExtCplRsp state 308, it will either forward the data, discard the data, or generate a bus error. If the microprocessor 100 receives an external acknowledge completion response 322, it will enter the FwdDat state 310 and forward the data in the incoming buffer 110 to the LSU 104, cache 106, and IFU 108. If, however, the microprocessor 100 receives an external bus error or negative acknowledge completion response 324, it enters the FlsDat state 312 where the data in the incoming buffer 110 is flushed, or discarded, and a bus error or negative acknowledge is sent to the LSU 104 or IFU 108. From the FwdDat 310 and FlsDat 312 states, the microprocessor returns to the default Idle state 302 until it issues another block read request.

FIG. 4 illustrates the four states of an external agent 102 during an outstanding block read request from the microprocessor 100. The default state for the external agent 102 is the Idle state 402 which indicates that there are no outstanding block read requests. When the microprocessor 100 issues a block read request to the external agent 410, the external agent 102 enters the ExtRspPnd state 404 indicating that an external response is pending. From this state, the external agent 102 has several options. First, if the external agent 102 knows the external completion response when the first data element of the block data response is available, the external agent 102 supplies an external acknowledge completion response coincident with the first data element of the block data response 418 and enters the DefDatRsp state 408. The DefDatRsp state 408 indicates that a definitive, non-speculative, external block data response is being supplied to the microprocessor's incoming buffer 110. After which, the external agent 102 returns to the default Idle state 402 waiting to receive another block read request.

Second, if the external agent 102 does not know the external completion response when the first data element of the block data response is available, the external agent 102 supplies the incoming buffer 110 with the external block data response 412 and enters the SpcDatRsp state 406. This state indicates that a speculative external block data response has been supplied to the microprocessor's incoming buffer 110. The external agent 102 stays in the SpcDatRsp state 406 until it establishes the validity of the data and issues an external completion response to the microprocessor 100. If the external agent 102 determines an error with the data transfer or with the data itself, the external agent 102 issues an external bus error or negative acknowledge completion response 420 and returns to the Idle state 402 until the next block read request. If, however, the external agent 102 validates the data that is in the incoming buffer 110, it issues an external acknowledge completion response 414. Once the external acknowledge completion response has been issued, the external agent 102 enters the DefDatRsp state 408 indicating that a valid non-speculative external block data response has been supplied to the incoming buffer 110 and is ready for access. The external agent 102 returns to the default Idle state 402 waiting to receive another block read request.

A third response by the external agent 102 in the ExtRspPnd state 404 is if the external agent 102 immediately knows that the data is not valid. In this case, the external agent 102 supplies the microprocessor 100 with an external bus error or negative acknowledge completion response 416 and returns to the Idle state 402.

The present invention can be implemented using a combination of hardware and software. More specifically, it is apparent to one skilled in the relevant arts that the incoming buffer 110, control logic 112, internal block data response path 114, external block data response path 116, external completion response path 118, and control path 120, as shown in FIGS. 1 to 2C, can be configured and implemented as hardware and software.

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A microprocessor with internal memory units connected to an external agent, comprising:

an incoming buffer connected to the internal memory units by an internal block data response path and to the external agent by an external block data response path, wherein said incoming buffer receives an external block data response into an entry partition from the external agent;

a control logic unit connected to said incoming buffer by a control path and to the external agent by an external completion response path, wherein said control logic unit receives an external completion response from the external agent over said external completion response path to signal said control logic unit to process said external block data response;

wherein said external block data response is only forwarded to the internal memory units upon the control of said control logic unit.

2. A microprocessor according to claim 1, wherein said incoming buffer further comprises a plurality of entry partitions.

3. A microprocessor according to claim 1, wherein said external completion response is either an acknowledge, negative acknowledge, or bus error signal.

4. A microprocessor according to claim 1, wherein said processing of the external block data response by said control logic unit comprises forwarding said external block data response to the internal memory units, discarding said external block data response, or causing said microprocessor to take an exception or retry the operation.

5. In a a microprocessor having internal memory units which is adapted to generate a block read request to an external agent, a method for managing the receipt of an external block data response from the external agent and transferring the external block data response to the internal memory units, comprising the steps of:

(a) generating the block read request to the external agent;

(b) receiving the external block data response from the external agent in an incoming buffer;

(c) receiving an external completion response from the external agent in control logic; and (d) parsing said external completion response by said control logic wherein said control logic directs said incoming buffer to forward the external block data response to the internal memory units if said external completion response indicates the external block data response contains valid data, or said control logic directs said incoming buffer to discard the external block data response in said incoming buffer if said external completion response indicates a bus error or the external block data response contains invalid data.

6. A microprocessor according to claim 5, wherein said step (b) is repeated a plurality of times before said step (c) is executed.

7. A microprocessor according to claim 5, wherein said steps (b) and (c) occur simultaneously, and said external completion response indicates that the external block data response contains valid data thereby triggering said control logic to forward the external block data response to the internal memory units.

* * * * *